United States Patent [19]

Miwa

[11] Patent Number: 5,995,519
[45] Date of Patent: *Nov. 30, 1999

[54] FM MULTIPLEX BROADCASTING RECEIVER

[75] Inventor: Kenji Miwa, Higashihiroshima, Japan

[73] Assignee: Sharp Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/799,371

[22] Filed: Feb. 14, 1997

[30] Foreign Application Priority Data

Apr. 12, 1996 [JP] Japan ................................ 8-091011

[51] Int. Cl.$^6$ ....................................................... H04J 3/06
[52] U.S. Cl. ................................................................ 370/509
[58] Field of Search ................................... 370/503, 506, 370/509, 510, 512, 513, 514, 516, 520; 375/354, 357, 362, 365, 366, 368, 371; 371/48, 49.1, 67.1; 714/799, 800, 801, 804, 819

[56] References Cited

U.S. PATENT DOCUMENTS

| | | | |
|---|---|---|---|
| 4,641,326 | 2/1987 | Tomisawa | 375/357 |
| 5,018,140 | 5/1991 | Lee et al. | 370/514 |
| 5,107,495 | 4/1992 | Kamoi et al. | 370/510 |
| 5,228,036 | 7/1993 | Okamoto et al. | 370/514 |
| 5,349,610 | 9/1994 | Sakamoto et al. | 375/354 |
| 5,432,800 | 7/1995 | Kuroda et al. | 371/37.7 |
| 5,668,840 | 9/1997 | Takano | 375/368 |
| 5,673,296 | 9/1997 | Ohgane | 375/368 |

*Primary Examiner*—Chi H. Pham
*Assistant Examiner*—Kwang B. Yao
*Attorney, Agent, or Firm*—Nixon & Vanderhye P.C.

[57] ABSTRACT

A receiver for FM Multiplex broadcast packet communications is provided that includes a block identifying code (BIC) detection circuit which determines whether a received packet is a data packet type or a parity packet type based on predetermined BIC patterns. The receiver further includes block counter circuitry that counts blocks in a synchronized frame and determines whether a received packet is a data type or a parity type (D/P) based on the count value. An abnormality detection circuit detects discrepancies between these two D/P determinations and indicates a synchronization abnormality. In another embodiment, the BIC detection circuit provides an indication of a received BIC type (BIC1–BIC4) based on predetermined BIC patterns while the block counter circuitry determines the BIC type based on the counted number of the block in a synchronized frame. In this case, the abnormality detection circuit detects discrepancies between the two BIC type determinations and indicates a synchronization abnormality. A history of detected abnormalities is stored in an abnormal history memory circuit. If the number of abnormalities detected exceeds a predetermined threshold within a predetermined period, a packet offset determining circuit then generates a signal for canceling the frame-in-synchronism state and initiates a resynchronization process.

8 Claims, 9 Drawing Sheets

Fig.3

| FRAME SYNCHRONISM | BLOCK SYNCHRONISM | RECEIVED D/P DETERMINATION | INTERNAL D/P DETERMINATION | FINAL D/P DETERMINATION | ABNORMALITY DETERMINATION RESULT |
|---|---|---|---|---|---|
| OFF | OFF | — | — | — | — |
| OFF | ON | D/P1 | (D/P2) | D/P1 | 0 (NORMAL) |
| ON | OFF | X | D/P2 | D/P2 | 0 |
| ON | ON | NOT DETECTED | D/P2 | D/P2 | 0 |
| ON | ON | D1 | D2 | D2 | 1 (ABNORMAL) |
| ON | ON | P1 | P2 | P2 | 1 |
| ON | ON | P1 | P2 | P2 | 0 |

Fig.4

| RECEIVED BLOCK NUMBER | 150 | 151 | 152 | 153 | 154 | 155 | 156 | 157 | 158 |
|---|---|---|---|---|---|---|---|---|---|
| INTERNAL BLOCK NUMBER | 150 | 151 | 152 | 153 | 154 | 155 | 156 | 157 | 158 |
| RECEIVED D/P DETERMINATION | D1 | D1 | P1 | D1 | D1 | P1 | D1 | D1 | P1 |
| INTERNAL D/P DETERMINATION | D2 | D2 | P2 | D2 | D2 | P2 | D2 | D2 | P2 |
| ABNORMALITY DETERMINATION RESULT | 0 | 0 | 0 | 0 | 0 | 0 | 0 | 0 | 0 |

Fig.5

| RECEIVED BLOCK NUMBER | 150 | 151 | 152 | 153 | 154 | 155 | 156 | 157 | 158 |
|---|---|---|---|---|---|---|---|---|---|
| INTERNAL BLOCK NUMBER | 149 | 150 | 151 | 152 | 153 | 154 | 155 | 156 | 157 |
| RECEIVED D/P DETERMINATION | D1 | D1 | P1 | D1 | D1 | P1 | D1 | D1 | P1 |
| INTERNAL D/P DETERMINATION | D2 | D2 | D2 | P2 | D2 | D2 | P2 | D2 | D2 |
| ABNORMALITY DETERMINATION RESULT | 0 | 0 | 1 | 1 | 0 | 1 | 1 | 0 | 1 |

Fig.6

| RECEIVED BLOCK NUMBER | 150 | 151 | 152 | 153 | 154 | 155 | 156 | 157 | 158 |
|---|---|---|---|---|---|---|---|---|---|
| INTERNAL BLOCK NUMBER | 148 | 149 | 150 | 151 | 152 | 153 | 154 | 155 | 156 |
| RECEIVED D/P DETERMINATION | D1 | D2 | P1 | D1 | D1 | P1 | D1 | D1 | P1 |
| INTERNAL D/P DETERMINATION | D2 | D2 | D2 | D2 | P2 | D2 | D2 | P2 | D2 |
| ABNORMALITY DETERMINATION RESULT | 0 | 0 | 1 | 0 | 1 | 1 | 0 | 1 | 1 |

Fig.7

| RECEIVED BLOCK NUMBER | 150 | 151 | 152 | 153 | 154 | 155 | 156 | 157 | 158 |
|---|---|---|---|---|---|---|---|---|---|
| INTERNAL BLOCK NUMBER | 147 | 148 | 149 | 150 | 151 | 152 | 153 | 154 | 155 |
| RECEIVED D/P DETERMINATION | D1 | D1 | P1 | D1 | D1 | P1 | D1 | D1 | P1 |
| INTERNAL D/P DETERMINATION | D2 | D2 | D2 | D2 | D2 | P2 | D2 | D2 | P2 |
| ABNORMALITY DETERMINATION RESULT | 0 | 0 | 1 | 0 | 0 | 0 | 0 | 0 | 0 |

*Fig.10*

| | | | BLOCK NUMBER |
|---|---|---|---|
| BIC CHANGE POINT 1 | BIC 1 | DATA PACKET | 1 |
| | ⋮ | | |
| | BIC 1 | DATA PACKET | 13 |
| BIC CHANGE POINT 2 | BIC 3 | DATA PACKET | 14 |
| | BIC 3 | DATA PACKET | 15 |
| | BIC 4 | PARITY PACKET | 16 |
| | ⋮ | | |
| | BIC 3 | DATA PACKET | 134 |
| | BIC 3 | DATA PACKET | 135 |
| | BIC 4 | PARITY PACKET | 136 |
| BIC CHANGE POINT 3 | BIC 2 | DATA PACKET | 137 |
| | ⋮ | | |
| | BIC 2 | DATA PACKET | 149 |
| BIC CHANGE POINT 4 | BIC 3 | DATA PACKET | 150 |
| | BIC 3 | DATA PACKET | 151 |
| | BIC 4 | PARITY PACKET | 152 |
| | ⋮ | | |
| | BIC 3 | DATA PACKET | 270 |
| | BIC 3 | DATA PACKET | 271 |
| | BIC 4 | PARITY PACKET | 272 |

Fig.11

| RECEIVED BLOCK NUMBER | INTERNAL BLOCK NUMBER | RECEIVED PACKET | INTERNAL PACKET DETERMINATION | |
|---|---|---|---|---|
| 1 | 2 | DATA (BIC 1) | DATA (BIC 1) | |
| 2 | 3 | DATA (BIC 1) | DATA (BIC 1) | |
| ... | ... | | | |
| 13 | 14 | DATA (BIC 1) | DATA (BIC 3) | |
| 14 | 15 | DATA (BIC 3) | DATA (BIC 3) | |
| 15 | 16 | DATA (BIC 3) | PARITY (BIC 4) | ※1 |
| 16 | 17 | PARITY (BIC 4) | DATA (BIC 3) | ※2 |
| ... | ... | | | |
| 134 | 135 | DATA (BIC 3) | DATA (BIC 3) | |
| 135 | 136 | DATA (BIC 3) | PARITY (BIC 4) | ※1 |
| 136 | 137 | PARITY (BIC 4) | DATA (BIC 2) | ※2 |
| 137 | 138 | DATA (BIC 2) | DATA (BIC 2) | |
| 138 | 139 | DATA (BIC 2) | DATA (BIC 2) | |
| ... | ... | | | |
| 149 | 150 | DATA (BIC 2) | DATA (BIC 3) | |
| 150 | 151 | DATA (BIC 3) | DATA (BIC 3) | |
| 151 | 152 | DATA (BIC 3) | PARITY (BIC 4) | ※1 |
| 152 | 153 | PARITY (BIC 4) | DATA (BIC 3) | ※2 |
| ... | ... | | | |
| 270 | 271 | DATA (BIC 3) | DATA (BIC 3) | |
| 271 | 272 | DATA (BIC 3) | PARITY (BIC 4) | ※1 |
| 272 | 1 | PARITY (BIC 4) | DATA (BIC 1) | ※2 |

※1 : DATA PACKET IS ERRONEOUSLY DETERMINED AS PARITY PACKET

※2 : PARITY PACKET IS ERRONEOUSLY DETERMINED AS DATA PACKET

FM MULTIPLEX BROADCASTING RECEIVER

BACKGROUND OF THE INVENTION

1. Field of the Invention

The present invention relates to a receiver for receiving FM multiplex broadcasting, and more particularly, to an FM multiplex broadcast signals receiver for receiving digital data multiplexed on FM multiplex broadcasting and transmitted from a broadcasting station.

2. Description of the Background Art

In FM multiplex broadcasting, digital information indicating characters, graphics or the like is multiplexed on FM broadcast signal. A receiver for FM multiplex broadcasting utilizes data and clock signal reproduced from multiplexed signals.

FIGS. 9, 10, and 11 respectively show a packet structure, a frame structure, and offset of synchronism.

With reference to FIG. 9, data has a packet structure for each block. The packet has a prescribed block identifying code (BIC) referred to as a block synchronization code, information bits, and a check code. The data packets respectively having block numbers 1–272 constitute one frame as shown in FIG. 10. Error correction is made packet by packet (horizontal correction) and frame by frame (vertical and horizontal correction). The receiver extracts a BIC pattern from a received data train and determines the division between blocks. Establishment of block synchronism is determined when the BIC pattern is detected a plurality of times, and a state in which synchronism is not achieved (out of synchronism) is determined if the BIC pattern is not detected a plurality of times. In the out of synchronism state, the establishment of synchronism of blocks is determined by detecting the BIC a prescribed number of times (number of backward protection of block synchronism) at an interval of one packet (at the timing of BIC detection generated by an internal BIC detection timing counter). This operation is referred to as block synchronism backward protection. When block synchronism is established, the out of synchronism state is determined by not detecting the BIC a prescribed number of times (number of forward protection of block synchronism) consecutively at an interval of one packet (BIC detection timing). This operation is referred to as block synchronism forward protection.

Referring to FIG. 10, 272 packets constituting a frame respectively have BICs corresponding to block numbers allotted. At four points in one frame, namely block numbers 1, 14, 137 and 150, points at which BIC changes (BIC change points) are provided. The block number can be specified by the BIC change point. Whether frame synchronism is established or not is determined by detecting or not detecting a plurality of BIC change points. In the out of synchronism state, establishment of frame synchronism is determined by detecting a prescribed number of BIC change points (number of backward protection of frame synchronism) consecutively at BIC change point detection timing (frame synchronism backward protection). When frame synchronism is established, if a prescribed number of BIC change points (number of forward protection of frame synchronism) are not consecutively detected at the BIC change point detection timing, the out of frame synchronism state is determined (frame synchronism forward protection).

There are two methods of determining packet type (i.e. data packet or parity packet). One method uses the BIC pattern extracted from received data and determines whether the BIC pattern is a data packet (BIC1–3) or a parity packet (BIC4). The other method uses a value of the receiver's block counter for frame and determines the packet type.

While frame synchronism is established, the block number of received data is synchronized with the block counter for frame of the receiver. However, the block number of received data may not be synchronized with the block counter for frame of the receiver due to the out of synchronism state of blocks caused by noise or the like, or false synchronism of blocks. For example, block synchronism may be lost if receiving conditions are deteriorated due to decreased intensity of the electric field or due to noise caused by multipath fading during frame synchronism state. When block synchronism is not established, the receiver carries out backward protection process of block synchronism, and extracts BIC patterns from a received data train. There may possibly be a data train which has the same bit pattern as BIC's. Further, a bit pattern that is the same as the BIC's may be generated more often than the number of backward protection of block synchronism at a packet period corresponding to the BIC detection timing. In such a case, false block synchronism may occur in which block synchronism is established at a timing other than the normal BIC detection timing.

Distinguished from regularly added normal BICs, a bit pattern which is the same as the BIC's that caused false block synchronism is unintentionally produced. Such false block synchronism is prevented by the aforementioned forward protection of block synchronism mechanism. In other words, a BIC pattern detection fails, out a block of synchronism state occurs, and eventually normal block synchronism would be established.

The receiver's "block counter for frame" counts received data packet by packet for each frame. The counter increments the count following a packet timing signal (dummy timing signal) produced by the receiver when the block synchronism is not established. The block counting operation switches to counting received packets once block synchronism is established. At the time of the switching, a "synchronization process" for the block counting operation is carried out. The synchronization process refers to an operation in which a difference between the packet timing generated by the receiver (receiver CPU) and the packet timing based on received data is corrected. For example, if block synchronism is established immediately after a counter increment operation from a packet timing signal generated by the receiver and counting should be performed based on received packets, the block counting is not based on received packets. On the other hand, if block synchronism is established immediately before a counter increment operation from a packet timing signal generated by the receiver and counting should be performed based on a received packet, then the block counting operation is carried out based on the received packets.

The above synchronization processing of the counting operation is effective when normal block synchronization is achieved. However, if the false block synchronization occurs, counting operation may be carried out at a timing which is not actually required, and the counting operation may not be carried out at the timing actually required. As a result, offset of synchronism occurs between the block number of received data and the block counter for frame of the receiver. When such offset of synchronism state occurs, BIC change points of received data cannot be detected at BIC change point detection timing generated by the block counter for frame. At this time, forward protection process of frame synchronism is performed, resulting in the out of frame synchronism state. As a result, the resynchronizing process mode of frame synchronism starts and synchronism is newly detected. During the period of forward protection, approximately two frames (about 10 seconds: about 380 data packets) are processed as data in frame synchronization, if the number of forward protection is 8.

Assume that the packet type is determined from the value of the block counter for frame of the receiver. If, at that time, offset of synchronization between the block number of received data and count value of the block counter for frame is 1 or 2 packets, about 164 parity packets would be determined erroneously as data packets and the same number of data packets would be determined erroneously as parity packets. The data in the data packets determined as parity packets are not used for creating a program. On the other hand, the parity packets are processed as normal data packets.

A problem caused in this situation is as follows. The parity packets regarded as data packets are combined with normal data packets and used for creating a program. When an error is detected by parity check for the program, the parity packets are discarded with data in the normal data packets. In this case, regular data is also discarded, so that data must be received again. On the other hand, if an error is not detected, the corresponding program could be improperly displayed.

Uncompleted data for a program is left in a program editing buffer or a receiving buffer as trash data. In this case, the available area in those buffers is decreased. As a result, efficiency in processing normal data, as well as efficiency in creating a program are impaired. In the worst case, the buffer fills with the trash data, a new program cannot be created, and reception becomes impossible. Such improper conditions would continue to have an affect even after normal frame synchronism is established by resynchronizing process of frame synchronism.

SUMMARY OF THE INVENTION

One aspect of the present invention is to provide a receiver for FM multiplex broadcasting which can reduce and avoid inappropriate conditions caused when a block number of received data is not synchronized with a block counter for frame of the receiver in packet communication.

Briefly stated, the present invention relates to a receiver for FM multiplex broadcasting in which a packet is prepared having predetermined data bits or parity bits, a frame is prepared having predetermined number of packets and data is transferred on the basis of the frame, block synchronism is determined by detecting a synchronization (BIC) attached to the head of the packet, and frame synchronization is determined by detecting a "change point" of the synchronization code, wherein the number of packets corresponding to one frame in frame synchronization is counted by a counter circuit, whether the packet is a data packet or a parity packet is determined based on the count, the determined packet type and a packet type determined based on the synchronization detecting signal are compared, and if these packet types differ from each other, an abnormality processing signal is output from a processing circuit.

According to the present invention, therefore, an error in determining packet type (data packet or parity packet) due to offset of received packets can be avoided. Further, an inappropriate operation of the receiver due to the determination error can be prevented. As a result, efficiency in frame resynchronizing process as well as receiving efficiency can be improved.

According to one aspect of the present invention, the number of packets corresponding to one frame when the frame is in synchronization is counted by a counter circuit, and a prescribed synchronizing signal is determined. The determined synchronizing signal is compared with a synchronizing signal detected from received data. When those synchronizing signals are different from each other, an abnormality processing signal is output from a processing circuit.

According to a preferred embodiment of the present invention, the result of the comparison of the packet type or the synchronizing signal determined by the counter circuit when the frame is in synchronization over a certain period is stored in a store circuit. Based on the stored result of the comparison over a certain period, if a frequency or a number of occurrences of the abnormality is achieved, frame synchronism is canceled and the process of resynchronizing the frame starts.

In a further preferred embodiment of the present invention, a result of comparison between packet type or synchronizing signal determined by the counter circuit in frame synchronization, and packet type determined from a synchronizing signal detected from received data or the synchronizing signal over a certain period is stored in a store circuit. The stored result of comparison is compared with a prescribed bit pattern of abnormality occurrence. If there is more than a prescribed number of matching patterns bits, the frame synchronism (the state of "frame-in-synchronism" is canceled i.e., an "out-of-synchronism" state is indicated and a frame resynchronizing process starts.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows a table for determining abnormality according to the first embodiment of the present invention.

FIG. 4 shows an example of a normal pattern according to the embodiment of the present invention.

FIG. 5 shows the first example of an abnormal pattern.

FIG. 6 shows the second example of an abnormal pattern.

FIG. 7 shows the third example of an abnormal pattern.

FIG. 10 shows a frame structure for the FM multiplex broadcasting receiver.

FIG. 11 shows offset of synchronism between received data and a block counter for frame.

DESCRIPTION OF THE PREFERRED EMBODIMENTS

Figure 1:
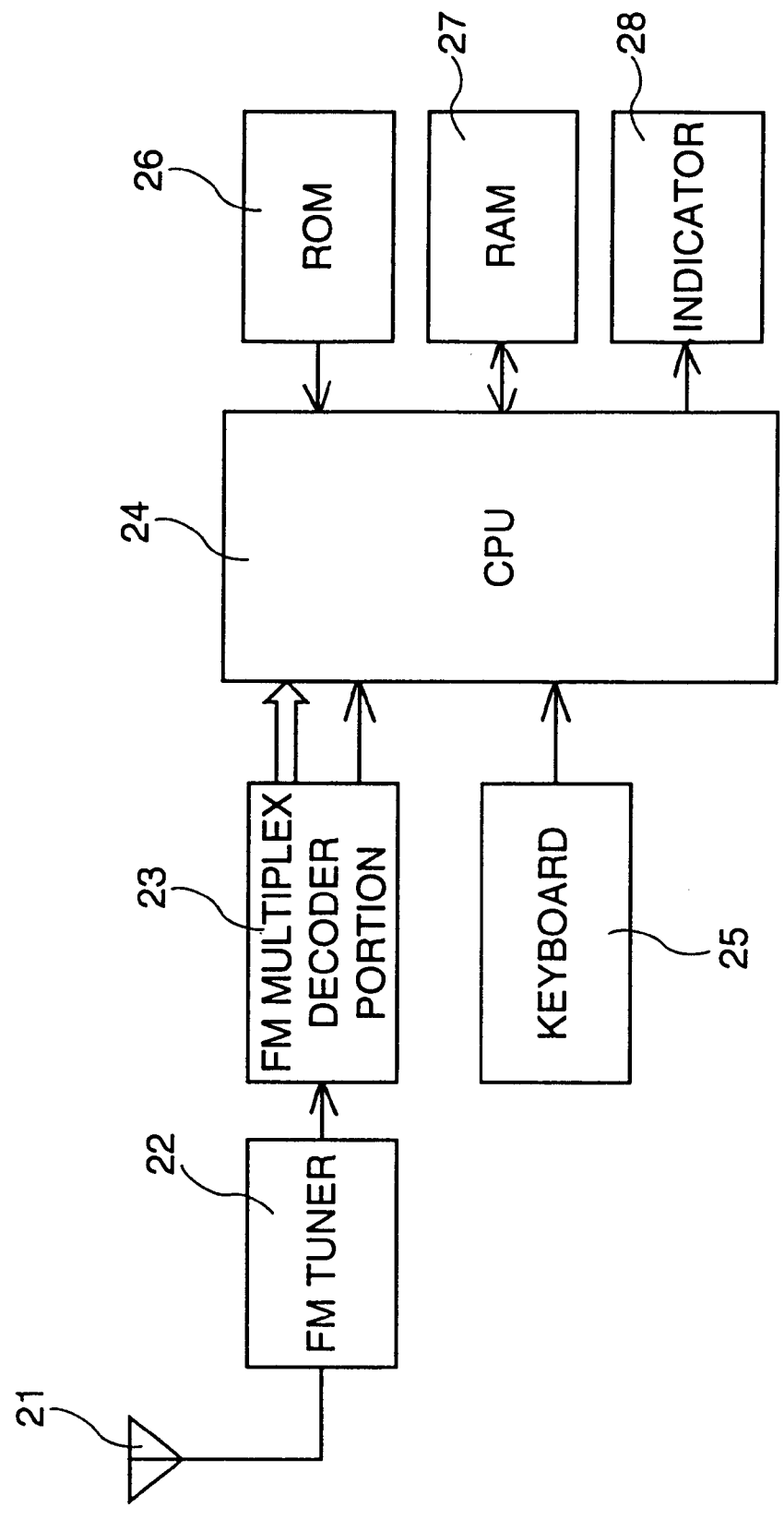
FIG. 1 is a schematic block diagram showing an entire structure of a receiver for FM multiplex broadcasting according to one embodiment of the present invention.

FIG. 1 is a schematic block diagram showing an entire structure of a receiver for FM multiplex broadcasting according to one embodiment of the invention. An FM tuner 22 receives FM wave via an antenna 21 and an FM character multiplex signal is decoded. The decoded output is supplied to an FM multiplex decoder portion 23 as well as to a speech processing circuit, and a speech signal is reproduced.

FM multiplex decoder portion 23, which includes an FM multiplex decoding portion, a synchronism detecting portion, and an error correcting portion, reproduces FM multiplex data and a block synchronizing signal from the decoded output from FM tuner 22 and provides them to a CPU 24. A keyboard 25, a ROM 26, a RAM 27, and an indicator 28 are connected to CPU 24. Keyboard 25 is used for switching the received frequency and for setting sound volume. ROM 26 stores a program necessary for operation of CPU. RAM 27 stores decoded character data or the like and the character data is indicated on indicator 28.

Figure 2:
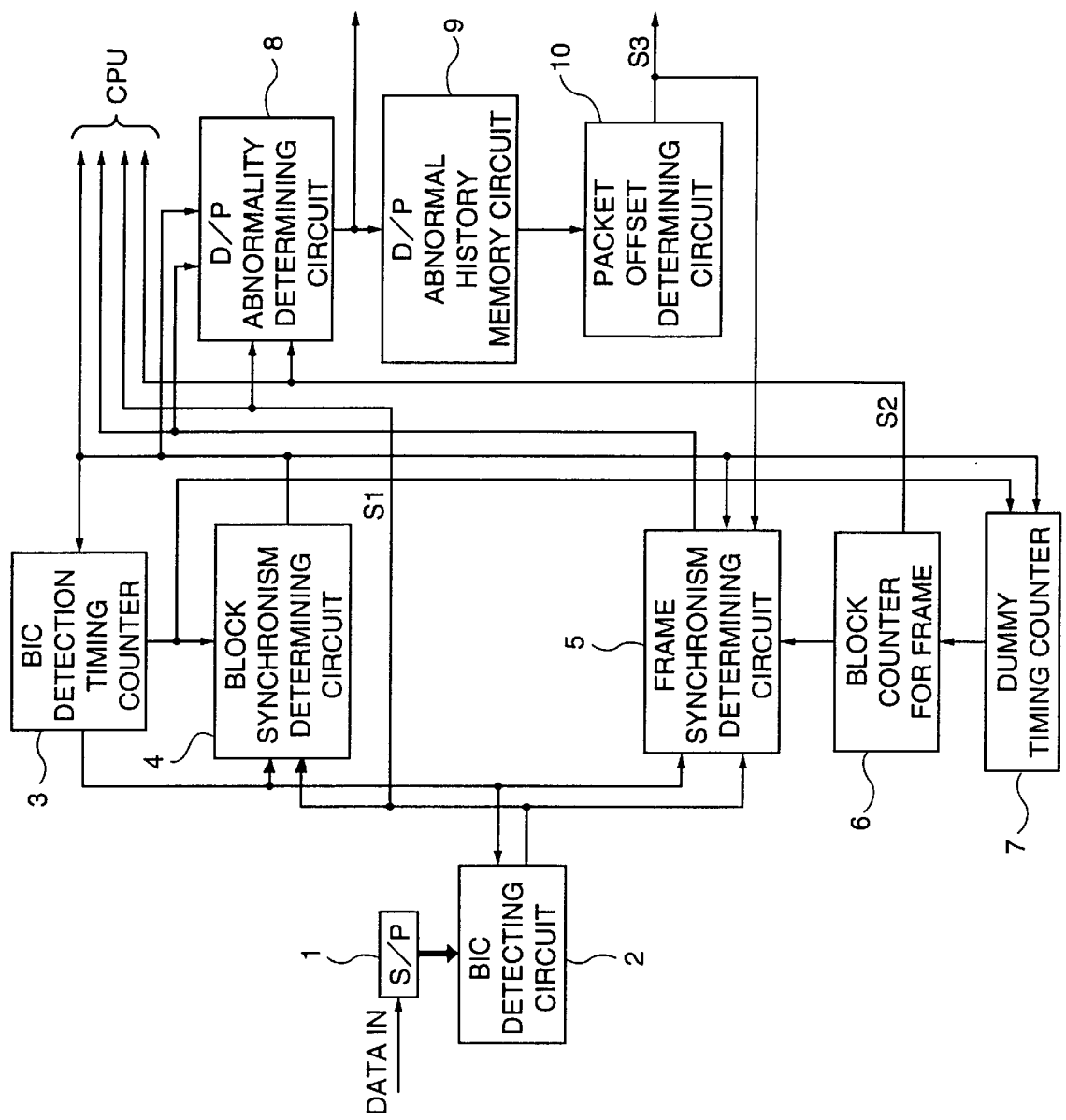
FIG. 2 is a block diagram showing a synchronism determining circuit of a receiver according to the first embodiment of the present invention.

FIG. 2 is a block diagram showing a synchronism determining circuit included in FM multiplex decoding portion 23 of the FM multiplex broadcasting receiver shown in FIG. 1. The synchronism determining circuit includes an S/P converter 1, a BIC detecting circuit 2, a BIC detection timing counter 3, a block synchronism determining circuit 4, a frame synchronism determining circuit 5, a block counter for frame 6, and a dummy timing counter 7. The synchronism determining circuit further includes a D/P abnormality determining circuit 8, a D/P abnormal history memory circuit 9, and a packet offset determining circuit 10 that characterize the present invention.

S/P converter 1 is constituted by, for example, a shift register, and converts received serial data into parallel data. BIC detecting circuit 2 compares the parallel data from S/P converter 1 with a an internally stored BIC pattern. The BIC comparison is carried out at the timing generated by BIC detection timing counter 3. BIC detecting circuit 2 outputs a BICEX signal indicating whether BIC is detected or not, and outputs the BIC number (BIC1–4) of the detected BIC, and a D/P1 signal indicating the result of the determination of data packet/parity packet based on detected the BIC pattern. It is noted that the BIC1–3 patterns are for data packets, and the BIC4 pattern is for parity packets. The BICEX signal and D/P1 signal are indicated together as S1 in FIG. 2.

BIC detection timing counter 3 generates a timing signal for detecting the BIC. The timing signal is also utilized as an initialization signal by a dummy timing counter 7 for use during a block in-synchronism state. Dummy timing counter 7 is synchronized with the timing of received data packets by this initialization signal. Block synchronism determining circuit 4 determines the existence of a block synchronism state based on the BICEX signal indicating whether a BIC is detected or not, which in turn is based on the timing signal generated by BIC detection timing counter 3. In the block in synchronism state, forward protection process of block synchronism is carried out, and backward protection process is carried out in the out-of-synchronism state.

Frame synchronism determining circuit 5, which includes a memory circuit for internally storing BIC information for two packets, determines the frame in-synchronism state by determining a BIC change point based on a timing signal generated by block counter-for-frame circuit 6. Block counter-for-frame circuit 6 generates a timing signal for determining frame synchronism, which is also the timing for a BIC change point, decodes its count value, and outputs a signal D/P (S2) for determining data packet/parity packet which is effective during the frame in-synchronism state.

Dummy timing counter 7 is used for generating a counter timing signal for block counter 6. Dummy timing counter 7 is initialized with BIC detection timing signal at the time of block synchronization(i.e., when blocks are synchronized within the frame), and generates a timing signal in synchronization with received data which acts a a BIC timing signal. The BIC detection timing signal may be supplied to block counter 6, and blocks for a frame may be counted using the signal at the timing of block synchronization. Dummy timing counter 7 generates a timing signal at a dummy packet timing during an out-of-synchronism state.

Next, D/P abnormality determining circuit 8, D/P abnormal history memory circuit 9, and packet offset determining circuit 10 that characterize the present invention will be described. D/P abnormality determining circuit 8 determines if the determination of data packet/parity packet is effective at the time of frame synchronization. The result of the determination is supplied to D/P abnormal history memory circuit 9. D/P abnormal history memory circuit 9 stores the result of a D/P abnormality determination for a prescribed period (e.g. for 8 packets). D/P abnormal history memory circuit 9 comprises, for example, a shift register, and its output is supplied to packet offset determining circuit 10. Packet offset determining circuit 10 compares the contents stored in D/P abnormal history memory circuit 9 with a prescribed bit offset determination pattern.

FIG. 4 shows a normal pattern, and FIGS. 5–7 show examples of abnormal patterns.

Next with reference to FIGS. 2–7, an operation according to the first embodiment of the present invention will be specifically described. S/P converter 1 converts received serial data into parallel data. BIC detecting circuit 2 compares the parallel data supplied from S/P converter 1 with an internally stored BIC pattern, and outputs a signal showing whether a BIC is detected or not, BIC number of the detected BIC (assuming a BIC was detected), and a result of the determination of whether the packet is a data packet/parity packet based on particular BIC pattern detected. Block synchronism determining circuit 4 determines the block synchronism state (i.e., blocks in-sync or out-of-sync) the signal, S1, showing whether a BIC is detected or not.

Frame synchronism determining circuit 5 determines the frame synchronism state (i.e., frame in-sync or out-of-sync) by determining BIC change points, based on a change point timing signal generated by frame block counter 6. Block counter 6 generates a timing signal for determining frame synchronism, decodes its count value and outputs a data packet/parity packet determination signal which is effective whenever the frame is in a synchronized state. Respective outputs from BIC detection circuit 2, block synchronism determining circuit 4, frame synchronism determining circuit 5, and frame block counter 6 are output to a CPU (not shown) as error information.

The operations of D/P abnormality determining circuit 8, D/P abnormal history memory circuit 9, and packet offset determining circuit 10 are now described. D/P abnormality determining circuit 8 detects any inappropriate condition caused by an error in determining data packet/parity packet. The error is due to packet offset caused by the offset between the output from block counter 6 and of counting of received data. In order to prevent an improper condition in which CPU 24 (used program/data decoding) erroneously mistakes a parity packet as a data packet in program decoding, the result of the determination made by D/P abnormality determining circuit 8 is supplied to the CPU as error information, and is supplied to D/P abnormal history memory circuit 9 for detecting packet offset. This determination is effective when frame synchronism and block synchronism are established.

As shown in FIG. 10, according to a format of transmission in FM multiplex broadcasting, a parity packet is interleaved with data packets for transmission in the portion corresponding to block numbers 14–136 and 151–272. Data is received in a cycle of three packets including two data packets and one parity packet. When there is any packet offset, an inappropriate condition occurs in which parity packets sent out in the portion corresponding to the block numbers 14–136 and 151–272 are processed as data packets, or data packets are processed as parity packets. When a count offset between block counter 6 and the received data occurs, and if the amount of the offset is a multiple of 3 as shown in FIG. 7, most of the parity packets are still output at parity packet, the appropriate time for a synchronized reducing the affect the improper condition. In this case, some occurences of an improper condition are found around the BIC change point and, the effect is limited to an amount equal to the amount of offset divided by three. On the other hand, as shown in FIGS. 5 and 6, if the amount of offset is other than multiples of three (multiple of 3±1, ±2), the number of occurences of the improper conditions is the number of parity packets (82 packets/frame). The generated pattern is a repetition of "110" ("1:abnormality detection, 1:abnormality detection, 0:normal) except for a region adjacent to the BIC change point.

Received data supplied to the CPU for processing is intended to be only the birary data from packets data packets. A data packet determined as a parity packet because of a count offset is discarded after error correction, consequently the binary data from that data packet is not output to the CPU for processing (programdecode). Therefore, the abnormality pattern described above supplied to the CPU would be a repetition of "1010". An abnormal signal supplied to the CPU would be equivalent in the following condition D/P1 and the result of the abnormality determination. As shown in FIG. 3, final determination of D/P at the time of frame synchronization (ON) is made based on internal determination of D/P (D/P2), and D2 data is supplied to the CPU at the final D/P determination. As for data packet, if the result of abnormality determination (represented by a "1") or received D/P determination (D/P1) represents parity packet (P1), the same logic can be applied.

The amount of packet offset which is other than a multiple of three (multiple of 3±1, ±2) is subjected to determination. When the amount is a multiple of three, the influence of an improper condition is not so significant, so that a conventional frame synchronism process (forward protection/backward protection) is carried out. If the amount of packet offset is other than a multiple of three, a result of abnormality determination is found as a repetition of "110" pattern around a BIC change point. A result of abnormality determination stored in D/P abnormal history memory circuit 9 is compared with a pattern of "11011011" (8 packets), and the result of the comparison is output from packet offset determining circuit 10 as signal S3 shown in FIG. 2. If the results of the comparison coincide with each other, signal S3 becomes active. The CPU recognizes from the S3 signal that packet offset is detected, and the frame in-synchronism state is canceled (i.e., a frame out of synchronism state is declared).

In the above description, the result of the abnormality determination is compared with a prescribed pattern. However, packet offset may also be determined when the number of abnormality determinations in a prescribed period (8 packets, for example) is more than a prescribed value (4 packets, for example). Alternatively, a counter which increments at the time of an abnormality detection and decrements at a time of normality detection may also be used and a packet offset condition will be declared if the value of the counter reaches a prescribed value or more. In either case, the prescribed abnormality pattern is used, and a determination of packet offset is made when amount of detected abnormalities is other than a multiple of three.

In the embodiment described above, a frame in-synchronism state is directly canceled by packet offset determination circuit 10. However, the CPU may also cancel a frame in synchronism state by, for example, a hardware reset.

Figure 8:
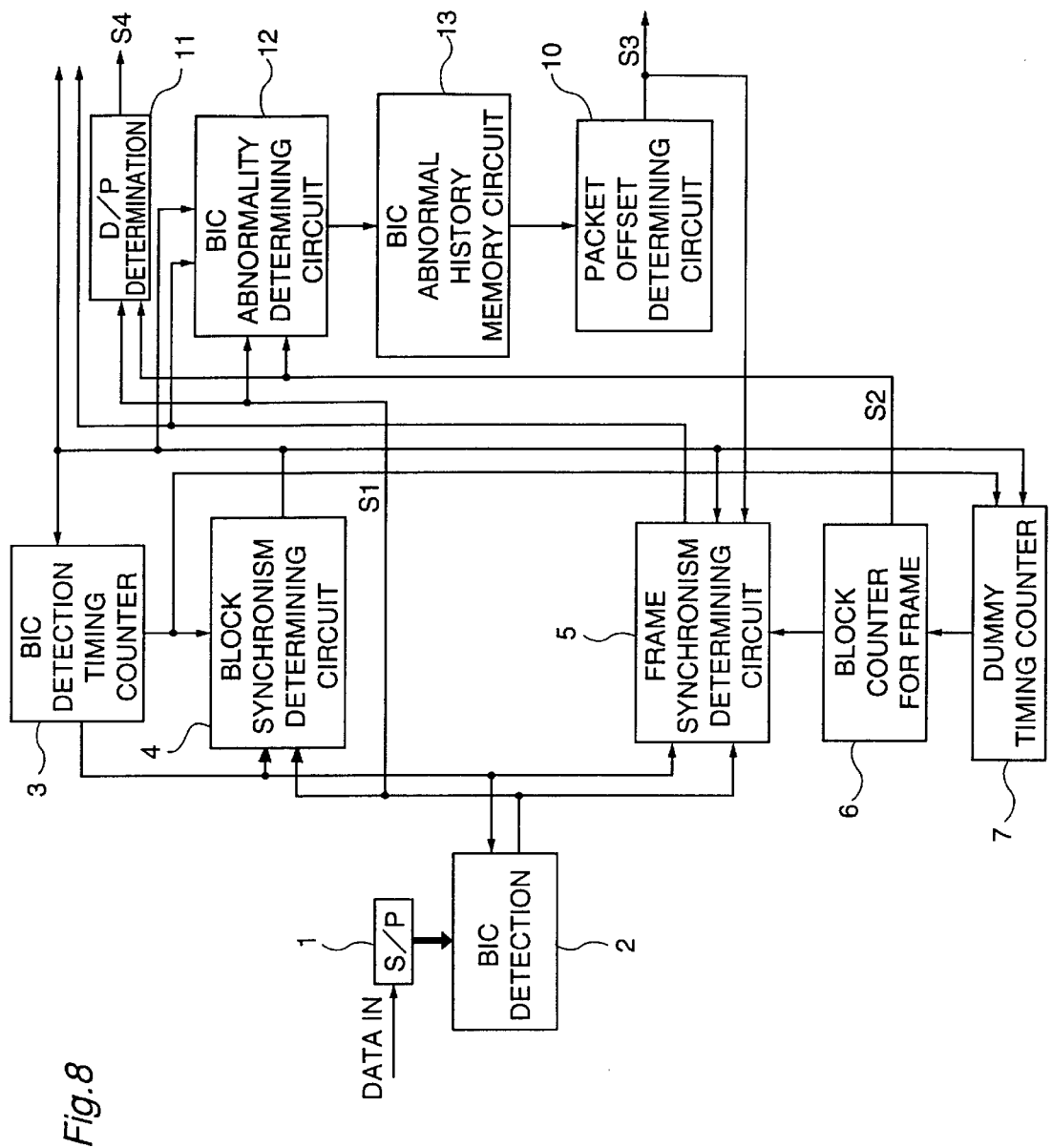
FIG. 8 is a block diagram of a synchronism determining circuit of a receiver according to the second embodiment of the invention.
Figure 9:
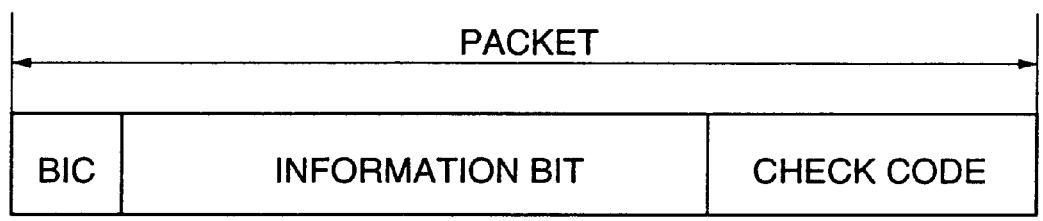
FIG. 9 shows a packet structure utilized by a receiver for FM multiplex broadcasting.

FIG. 8 is a block diagram showing a second embodiment of the invention. In the foregoing embodiment, abnormality and packet offset are determined by determining data packet and parity packet. In this embodiment, abnormality and packet offset are determined based on BIC determination. Accordingly, a D/P determining circuit 11, a BIC abnormality determining circuit 12, and a BIC abnormal history memory circuit 13 are provided instead of D/P abnormality determining circuit 8, D/P abnormal history memory circuit 9 shown in FIG. 2.

According to this embodiment, one frame is divided into the following three sections based on BIC patterns.

Section 1 (b1): block numbers 1–13
Section 2 (b2): block numbers 137–149
Section 3 (b3): block numbers 14–136 and 150–272

BIC detecting circuit 2 provides BIC type (BIC1-4) determined from received data. Block counter-for-frame circuit 6 decodes its count value and generates section signals b1 through b3 1-3 as well as an internal BIC (IBIC1-4). D/P determining portion 11 determines data packet/parity packet from the BIC and the internal BIC. In the out-of-frame synchronism state, this determination is made based on the BIC signal output from BIC detection circuit 2. In the frame in-synchronism state, this determination is made based on the internal BIC generated by block counter for frame 6.

A logic expression for this D/P packet type determination is as follows:

DATA PACKET=not (FRMLOCK)·(BIC1+BIC2+BIC3)+ FRMLOCK·(IBIC1+IBIC2+IBIC3)

where FRMLOCK: FRAME SYNCHRONISM='1', OUT OF FRAME SYNCHRONISM='0';
'·': AND, '+': OR BIC abnormality determining circuit 12 determines BIC abnormality in the frame in-synchronism state. The BIC abnormality refers to a condition in which BIC detected from received data does not correspond to internal BIC generated by block counter-for-frame circuit 6. A logic expression for this determination is as follows:

BIC ABNORMALITY DETERMINATION= FRMLOCK·(b1·(BIC2+BIC3+BIC4)+b2·(BIC1+BIC3+BIC4)+ b3·BIC3·(BIC1+BIC2+BIC4)+b3·BIC4·(BIC1+BIC2+BIC3)

BIC abnormal history memory circuit 13 stores a history of abnormality determined by BIC abnormality determining circuit 12. Packet offset determining circuit 10 compares, in the manner similar to the embodiment shown in FIG. 2, the content stored in BIC abnormal history memory circuit 13 with a prescribed bit offset pattern. When results of the comparison coincide with each other, signal S3 is made active, the program decode CPU recognizes that packet offset is detected, and frame synchronism is canceled.

As described above, according to the present embodiment of the present invention, packet type (data packet or parity packet) is determined by counting the number of packets occurring in one frame during a frame in-synchronization state, or a predetermined synchronization code indicating signal is detected, the determined type of the packet or the determined synchronization code is compared with the packet type determined based on block synchronization code the synchronizing determined based on the received data, and if the types of the packets or the signals do not coincide with each other, an abnormal state is determined. As a result, an error in determining whether a received packet is a data packet or a parity packet caused by received packet offset can be avoided. Further, an improper condition of the receiver due to an error in packet type determination can be prevented, and efficiency in the resynchronizing process of a frame as well as the overall efficiency of receiving and processing data can be improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A receiver for receiving digital data multiplexed on FM multiplex broadcast signals wherein a packet of digital information is structured as either a data packet comprising a block of binary data bits or as a parity packet comprising a block of binary parity bits and a frame comprises a plurality of packets, and wherein block synchronism of de-multiplexed data is determined at least in part by detecting a block synchronization code attached to the head of each packet and frame synchronism is determined at least in part by detecting a change in the block synchronization code occurring at predetermined blocks, said receiver comprising:

block counter circuitry, said block counter circuitry composing a counter for counting packets in a synchronized frame of received data and producing a first signal indicative of whether a received packet is of a data packet type or a parity packet type based on predetermined block count values;

a block identification code detection circuits said detection circuit comprising digital logic circuitry for detecting a block synchronization code in a received packet and producing a second signal indicative of whether a received packet is of a data type or a parity type based on predetermined synchronization code patterns; and an abnormality determining circuit, said determining circuit comprising digital logic circuitry for comparing said second signal indicative of packet type determined from said synchronization code with said first signal indicative of packet type determined by said counter circuitry and outputting an abnormality indication signal when said first and second signals indicate different packet types.

2. A receiver for FM multiplex broadcasting according to claim 1, further comprising:

an abnormality history circuit comprising digital data storage circuitry for storing a bit pattern of accumulated abnormality indication signals produced by said abnormality determining circuit over a prescribed period; and a packet offset determining circuit comprising logic circuitry for comparing a stored history of abnormality indication signals with a predetermined bit offset pattern indicative of a packet offset condition and providing a signal for canceling a frame-in-synchronism state and initiating frame resynchronization when a result of said comparing indicates a predetermined number of matching pattern bits.

3. A receiver for FM multiplex broadcasting according to claim 1, further comprising:

an abnormality history circuit comprising digital data storage circuitry for storing a bit pattern of accumulated abnormality indication signals produced by said abnormality determining circuit over a prescribed period; and a packet offset determining circuit comprising logic circuitry for comparing a stored history of abnormality indication signals with a predetermined bit offset pattern indicative of a packet offset condition and providing a signal for canceling a frame-in-synchronism state and initiating frame resynchronization when a result of said comparing indicates a predetermined number of frequency or abnormality indication signals has been exceeded.

4. A receiver for receiving digital data multiplexed on FM multiplex broadcast signals wherein a packet of digital information is structured as either a data packet comprising a block of binary data bits or as a parity packet comprising a block of binary parity bits and a frame comprises a plurality of packets, and wherein block synchronism of de-multiplexed data is determined at least in part by detecting a block synchronization code attached to the head of each packet and frame synchronism is determined at least in part by detecting a change in the block synchronization code occurring at predetermined blocks, said receiver comprising:

block counter circuitry, said block counter circuitry comprising a counter for counting packets in a synchronized frame of received data and producing a first signal indicative of a block synchronization code type based on predetermined block count values;

a block identification code detection circuit, said detection circuit comprising digital logic circuitry for detecting a block synchronization code in a received packet and producing a second signal indicative of a synchronization code type based on predetermined synchronization code patterns; and an abnormality determining circuit, said determining circuit comprising digital logic circuitry for comparing said second signal indicative of a synchronization code type determined from said synchronization code with said first signal indicative of a synchronization code type determined by said counter circuitry and outputting an abnormality indication signal when said first and second signals indicate different synchronization code types.

5. A receiver for FM multiplex broadcasting according to claim 4, further comprising;

an abnormality history circuit comprising digital data storage circuitry for storing a bit pattern of accumulated abnormality indication signals produced by said abnormality determining circuit over a prescribed period; and a packet offset determining circuit comprising logic circuitry for comparing a stored history of abnormality indication signals with a predetermined bit offset pattern indicative of a packet offset condition and providing a signal for canceling a frame-in-synchronism state and initiating frame resynchronization when a result of said comparing indicates a predetermined number of matching pattern bits.

6. A receiver for FM multiplex broadcasting according to claim 4, further comprising:

an abnormality history circuit comprising digital data storage circuitry for storing a bit pattern of accumulated abnormality indication signals produced by said abnormality determining circuit over a prescribed period; and a packet offset determining circuit comprising logic circuitry for comparing a stored history of abnormality indication signals with a predetermined bit offset pattern indicative of a packet offset condition and providing a signal for canceling a frame-in-synchronism state and initiating frame resynchronization when a result of said comprising indicates that a predetermined number or frequency of abnormality indication signals has been exceeded.

7. In an FM Multiplex broadcasting packet communications arrangement wherein a frame of transmitted digital information comprises a predetermined number of blocks which are either of a data packet type or a parity packet type and each block includes a header comprising a block identifying code (BIC) which may be used for block and frame synchronization purposes, and wherein certain change points indicated by changes in BICs within a frame are used to provide a means for radio receiver equipment to determine frame synchronization, and wherein different types of BICs also distinguish parity packets from data packets, and further wherein parity type packets occur only at specific prescribed blocks within a frame, identifiable by the sequential position of a block within a synchronized frame and/or by the type of BIC, a method for determining a packet offset condition indicative of an out-of-synchronization frame in a radio receiver, comprising the steps of:

a) counting blocks received in a synchronized frame;

b) determining from said counting whether a received block is a data packet or a parity packet;

c) detecting a BIC in a received block of data;

d) determining whether the BIC indicates that the received block is a data packet or a parity packet; and e) generating a signal indicative of a packet abnormality whenever determinations of packet type made in steps (b) and (d) indicate different packet types.

8. A method as set forth in claim 7 further comprising the steps of:

storing packet abnormality indication signals over a predetermined period of time;

comparing a pattern of abnormality indication signals stored over a predetermined period of time with a prescribed bit pattern indicative of a frame-out-of-synchronism state; and generating a signal for canceling a frame-in-synchronism state and initiating frame resynchronization when a result of said comparing indicates that a predetermined number or frequency of abnormality indication signals has been exceeded.

* * * * *